(12) United States Patent
Wachs

(10) Patent No.: US 6,497,855 B1
(45) Date of Patent: Dec. 24, 2002

(54) PROCESS FOR THE PRODUCTION OF HYDROGEN FROM HYDROGEN SULFIDE

(75) Inventor: Israel E. Wachs, Bridgewater, NJ (US)

(73) Assignee: Lehigh University, Bethlehem, PA (US)

( * ) Notice: Subject to any disclaimer, the term of this patent is extended or adjusted under 35 U.S.C. 154(b) by 0 days.

(21) Appl. No.: 09/576,222

(22) Filed: May 22, 2000

Related U.S. Application Data

(60) Provisional application No. 60/191,107, filed on Mar. 22, 2000.

(51) Int. Cl.$^7$ .............................. C01B 3/06; C01B 17/50
(52) U.S. Cl. ................ 423/648.1; 423/220; 423/242.1; 423/244.09; 423/244.1; 423/246; 423/247; 423/418.2; 423/512.1; 423/539; 423/542
(58) Field of Search ............................. 423/418.2, 539, 423/542, 512.1, 648.1, 220, 246, 242.1, 219, 247, 658.1, 244.09, 244.1

(56) References Cited

U.S. PATENT DOCUMENTS

| | | | | |
|---|---|---|---|---|
| 4,277,458 A | * | 7/1981 | Sugier et al. | 423/437 |
| 4,427,576 A | | 1/1984 | Dupin | 502/218 |
| 4,432,960 A | * | 2/1984 | Herrington et al. | 423/539 |
| 4,489,048 A | * | 12/1984 | Kuch | 423/416 |
| 4,500,505 A | * | 2/1985 | Jevnikar et al. | 423/416 |
| 4,618,723 A | | 10/1986 | Herrington et al. | 568/70 |
| 4,668,825 A | * | 5/1987 | Ratcliffe et al. | 568/70 |

OTHER PUBLICATIONS

Sun et al. "Partial Oxidation of Methane by Molecular Oxygen Over Supported $V_2O_5$ Catalysts: A Catalytic and in situ Raman Spectroscopy Study", Methane and Alkane Conversion Chemistry, pp. 219–226 (1995).

Herman et al. "Development of Active Oxide Catalysis for the Direct Oxidation of Methane to Formaldehyde", (Elsevier) Catalysts 37 Today pp. 1–14 (1997).

Sun et al. "In Situ Raman Spectroscopy During the Partial Oxidation of Methane to Formaldehyde Over Supported Vanadium Oxide Catalysts", Journal of Catalysis 165 pp. 91–101 (1997) Article No. CA971446.

MFR Mulcahy, "The Kinetics of Combustion of Gaseous Sulphur Compounds" Combustion and Flame 18, pp. 225–292 (1972) CSIRO Division of Mineral Chemistry, North Ryde NSW, Australia.

C.E.H. Bawn, "The Oxidation of Carbonyl Sulphide", 46. pp. 145–150, Journal of Chemical Society (1933).

"Catalytic Activity of Metal Sulfides for the Reaction, $H_2S$+ $CO=H_2$ +COS", Journal of Catalysis 49, pp. 379–382 (1977).

Jehng et al. "Surface Modified Niobium Oxide Catalyst: Synthesis, Characterization, and Catalysis", 179–200 (1992). Applied Cat. A: Gen. (33).

Kim et al. "Surface Chemistry of Supported Chromium Oxide Catalysts", Journal of Catalysis 142, pp. 166–171 (1993).

Jehng et al. "Molecular Design of Supported Niobium Oxide Catalysts", Elsevier Science Publishers B. V. (1993). Catalysis Today (16) 1993 417–426.

Kim et al. "Surface Rhenium Oxide–Support Interaction for Supported $Re_2O_7$ Catalysts", Journal of Catalysis 141, pp. 419–429 (1993).

Applied Catlysis A: Gen. Deo et al. "Physical and Chemical Characterization of Surface Vanadium Oxide Supported on Titania: Influence of the Titania Phase (Anatase, Rutile, Brookite and B)", 91 pp. 27–42 (1992).

Deo et al. "Reactivity of Supported Vanadium Oxide Catalysts: The Partial Oxidation of Methanol" Journal of Catalysis 146, pp. 323–334 (1994).

Deo et al. "Effect of Additives on the Structure and Reactivity of the Surface Vanadium Oxide Phase in $V_2O_5/TiO_2$ Catalysts", Journal of Catalysis 146, pp. 335–345 (1994).

Jehng et al. "Surface Chemistry of Silica–Titania–Supported Chromium Oxide Catalysts" J. Chem. Soc. Faraday Trans., 91(5) pp. 953–961 (1995).

Kim et al. "Molecular Structures and Reactivity of Supported Molybdenum Oxide Catalysts", Journal of Catalysis 146, pp. 268–277 (1994).

Banares et al. "Molybdena on Silica Catalysts: Role of Preparation Methods on the Structure– Selectivity Properties for the Oxidation of Methanol", Journal of Catalysis 150 pp. 407–420 (1994).

Jehng et al. "The Molecular Structures and Reactivity of $V_2O_5/TiO_2/SiO_2$ Catalysts" Catalysis Letters 13 pp. 9–20 (1992).

* cited by examiner

Primary Examiner—Stanley S. Silverman
Assistant Examiner—Timothy C. Vanoy
(74) Attorney, Agent, or Firm—Banner & Witcoff, Ltd.

(57) ABSTRACT

A process is provided for the production of hydrogen from hydrogen sulfide by reacting carbon monoxide with hydrogen sulfide to produce hydrogen and carbonyl sulfide, and then reacting the carbonyl sulfide with oxygen to produce carbon monoxide and sulfur dioxide. The carbon monoxide is recycled back to the hydrogen sulfide reaction step. The catalyst used to promote the reaction between carbonyl sulfide and oxygen is an oxide of a metal, such as V, Nb, Mo, Cr, Re, Ti, W, Mn or Ta, which is supported on a support, such as $TiO_2$, $ZrO_2$, $CeO_2$, $Nb_2O_5$ and $Al_2O_3$.

20 Claims, 2 Drawing Sheets

PROCESS FOR THE PRODUCTION OF HYDROGEN FROM HYDROGEN SULFIDE

CROSS REFERENCE TO RELATED APPLICATIONS

This application claims the benefit under 35 U.S.C. 119 (e)(1) of prior filed provisional application 60/191,107 filed Mar. 22, 2000.

This invention was made using U.S. government funds awarded by the National Science Foundation. Therefore the government retains certain rights in the invention.

FIELD OF THE INVENTION

The present invention is directed to a catalytic process for selectively oxidizing carbonyl sulfide (COS) and carbon disulfide ($CS_2$) to carbon monoxide (CO) and sulfur dioxide ($SO_2$). The process of the invention is particularly useful in combination with the known equilibrium reaction for producing hydrogen from hydrogen sulfide. Such combination provides a cost effective way of producing hydrogen from what are often considered waste sulfur streams. The so-produced hydrogen can be used for a variety of purposes as is well known in the art.

BACKGROUND OF THE INVENTION

Carbonyl sulfide (COS) is found in many industrial process streams such as those associated with natural gas production, petroleum refineries and coal gasification plants. COS often is catalytically converted by hydrogenation to methane ($CH_4$), hydrogen sulfide ($H_2S$) and water; by hydrolysis to carbon dioxide ($CO_2$) and $H_2S$, or by oxidation to $CO_2$ and sulfur dioxide ($SO_2$). Hydrogenation is an expensive waste of valuable hydrogen ($H_2$), while hydrolysis and total oxidation produces $CO_2$, considered by many to be an environmental threat due to its alleged impact on global warming.

Carbon disulfide ($CS_2$) is another organic sulfur pollutant. $CS_2$ is commonly encountered in paper manufacturing waste streams and in petroleum refineries. It can be treated much like COS to yield the same end products. Even though these methods provide the important removal of environmentally unsafe reduced sulfur compounds, they do not produce valuable chemicals from the original sulfur pollutants.

$H_2S$ is commonly encountered in petroleum refineries where hydrodesulfurization is widely used to remove sulfur from gasoline. A significant amount of $H_2S$ (oftentimes as much as 10–30%) also is found in natural gas recovered from geological formations. The $H_2S$ is typically separated from the methane and the resulting de-sulfurized methane typically is distributed for industrial and personal uses, such as for home heating. The isolated $H_2S$ often is converted to elemental sulfur via the Claus Process. In the Claus Process, a first portion of the separated hydrogen sulfide is converted (oxidized) to sulfur dioxide ($SO_2$) and water and the remaining portion of the hydrogen sulfide is reacted with the water-laden sulfur dioxide in the presence of a suitable catalyst to produce additional water and elemental sulfur. The so-produced sulfur represents a low value-added, commodity product, while essentially all of the potentially valuable hydrogen resident in the $H_2S$ is converted into water. The development of a cost effective alternative for using the hydrogen sulfide, and especially for recovering at least a portion of its hydrogen content, would significantly improve the economies of sour natural gas recovery and processing and would greatly benefit the operation of petroleum refinery operations.

Herrington et al., U.S. Pat. No. 4,618,723 describes processes for using $H_2S$ as a reducing agent to reduce carbon oxides and generate hydrogen which is then used, as described, to make such organic compounds as alkanes, alcohols, alkenes and the like. The focus of such processes is to upgrade carbon dioxide and carbon monoxide to valuable organic compounds using $H_2S$ as a reducing agent. The patent presents the equilibrium reaction in which $H_2S$ is used to produce $H_2$ from carbon monoxide, with by-product COS. The patent also shows the oxidation reaction involving COS to produce CO and $SO_2$. This reaction, however, is conducted either in the absence of a catalyst or in the presence of quartz chips ($SiO_2$) as a catalyst. Unfortunately, the yield (conversion) and selectivity of this step, as obtained under these conditions, has simply not been sufficiently high to make hydrogen production from $H_2S$ a cost effective alternative.

Thus, it would be advantageous if a process were available for selectively converting organic sulfur pollutants, such as COS and $CS_2$, at high yield (conversion) and selectivity to CO and $SO_2$. Such a process would make practicably feasible the conversion of $H_2S$ to the valuable end product, $H_2$.

U.S. Pat. No. 4,427,576 generally describes catalytically oxidizing $H_2S$ and/or organosulfur compounds to $SO_2$ using titanium dioxide (titania) with zirconia or silica ($SiO_2$), an alkaline earth metal sulfate and one of the elements Cu, Ag, Zn, Cd, Y, lanthanides, V, Cr, Mo, W, Mn, Fe, Co, Rh, Ir, Ni, Pd, Pt, Sn and Bi.

SUMMARY OF THE INVENTION

The present invention is directed to a process for selectively oxidizing carbonyl sulfide (COS) and carbon disulfide ($CS_2$) to carbon monoxide (CO) and sulfur dioxide ($SO_2$):

$$COS + O_2 \rightarrow CO + SO_2$$

$$2CS_2 + 5O_2 \rightarrow 2CO + 4SO_2$$

The CO can be used to produce valuable hydrogen, such as via the water gas shift reaction;

$$CO + H_2O \leftrightarrows CO_2 + H_2$$

or more preferably from $H_2S$ via the known equilibrium reaction:

$$H_2S + CO \leftrightarrows COS + H_2$$

In this later reaction, the COS, in turn, is used to generate additional CO for the above reaction with $H_2S$. The by-product $SO_2$ also can be converted, if desired, to elemental sulfur, or to sulfuric acid.

In particular, the present invention is based on the discovery that by contacting COS, and/or $CS_2$, in the presence of excess oxygen, with a supported metal oxide catalyst, one can selectively oxidize these organic sulfur compounds to CO and $SO_2$. In particular, applicant has discovered that a supported metal oxide catalyst using the oxide of one or more of a variety of different catalytic metal oxides, i.e., comprising a metal oxide of a metal selected from the group consisting of vanadium (V), niobium (Nb), molybdenum (Mo), chromium (Cr), rhenium (Re), titanium (Ti), tungsten (W), manganese (Mn), tantalum (Ta) and mixtures thereof, supported on a metal oxide support selected from the group consisting of titania, antimony oxides, tantala, tin oxide, lanthana, indium oxides, iron oxides, nickel oxide, cobalt oxide, gallium oxides, manganese oxides, chromia, tungsten oxide, hafnia, zirconia, ceria, niobia, silica and alumina, such as vanadia on a titania support, is able to promote the selective oxidation of COS and $CS_2$ to CO and $SO_2$. As a general rule, the metal oxide support and the supported metal oxide surface layer should not be the same.

On the basis of cost and availability the preferred metal oxide supports are selected from the group consisting of titania ($TiO_2$), zirconia ($ZrO_2$), ceria ($CeO_2$), niobia ($Nb_2O_5$), silica ($SiO_2$) and alumina ($Al_2O_3$). Vanadia is often preferred as the metal oxide surface coating. Especially preferred catalysts are a 5% $V_2O_5$ surface coating on a $Nb_2O_5$ support (5% $V_2O_5$ on $Nb_2O_5$ catalyst), which for COS oxidation at 290° C. provides a selectivity to CO of 98% and for $CS_2$ oxidation provides an 80% selectivity to CO and a coating of $V_2O_5$ on a $SiO_2$ support, which for $CS_2$ oxidation provides a selectivity towards CO higher than 90% at 270° C.

By coupling these oxidation reactions with the known equilibrium reaction involving the conversion of $H_2S$ and CO to $H_2$ and COS (and often some $CS_2$ and $CH_3SH$ as byproducts), one is able to convert what are otherwise environmentally undesirable sulfur pollutants to a very valuable material, $H_2$ and by-product $SO_2$. The $SO_2$ is not laden with as much moisture as when produced directly from $H_2S$ oxidation and thus can be sent to a Claus plant for more efficient conversion to elemental sulfur, or alternately it can be further oxidized to sulfuric acid ($H_2SO_4$).

DETAILED DESCRIPTION OF THE INVENTION

Figure 1:
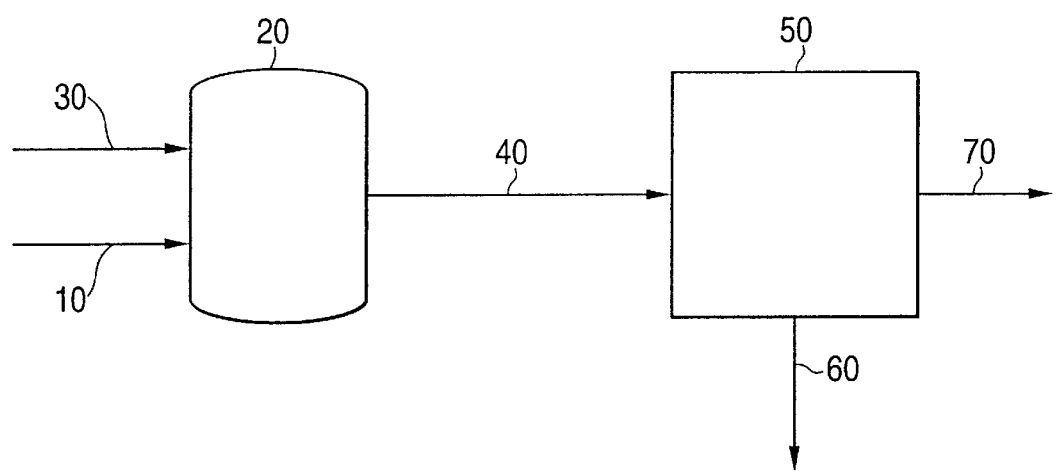
FIG. 1 is a simplified schematic flow diagram illustrating a basic aspect of the present invention.

In its basic form the present invention provides a process for the conversion of COS and/or $CS_2$ to CO by subjecting the same to oxidation, as with air or oxygen, in the presence of a catalyst essentially comprising a supported metal oxide catalyst. In accordance with the present invention, the metal oxide can be supported on a variety of different metal oxide supports selected from the group consisting of titania, antimony oxides, tantala, tin oxide, lanthana, indium oxides, iron oxides, nickel oxide, cobalt oxide, gallium oxides, manganese oxides, chromia, tungsten oxide, hafnia, zirconia, ceria, niobia, silica and alumina. On the basis of cost and availability the preferred metal oxide supports are selected from the group consisting of zirconia ($ZrO_2$), ceria ($CeO_2$), niobia ($Nb_2O_5$), titania ($TiO_2$), silica ($SiO_2$) and alumina ($Al_2O_3$). The supported metal oxide catalyst is able to promote the selective oxidation of COS and $CS_2$ to CO and $SO_2$.

The supported metal oxide itself is made from a metal selected from the group consisting of vanadium (V), niobium (Nb), molybdenum (Mo), chromium (Cr), rhenium (Re), titanium (Ti), tungsten (W), manganese (Mn), tantalum (Ta) and mixtures thereof. Vanadia is a preferred metal oxide for coating on the surface of the metal oxide support. As a general rule, the metal oxide support and the supported metal oxide monolayer should not be the same.

In another of its preferred features, the present invention provides a process, as hereinbelow described, wherein the catalytic oxidation of COS to CO and $SO_2$ is integrated with the equilibrium reduction of CO with $H_2S$ so as to provide an efficient and cost effective manner of dealing with reduced sulfur pollutants, such as $H_2S$, $CS_2$ and mercaptans, while producing a valuable product, hydrogen.

Other aspects, concepts, objects, and the several advantages of the invention are apparent from a study of this disclosure and the appended claims.

According to the present invention there is provided a process for the conversion of COS and/or $CS_2$ to CO and $SO_2$ by subjecting said organic sulfur compounds to oxidation as with air or oxygen. The partial oxidation of carbonyl sulfide to carbon monoxide and sulfur dioxide is a known reaction. See such articles as *Journal of the Chemical Society,* Bawn, C. E. H., 1933, 145 and *Combustion and Flame,* Cullis, C. F. and Mulcahy, M. F. R., 18, 225 (1972). The oxidation of carbon disulfide to carbon monoxide and sulfur dioxide also is known. While it is known that such combustion reactions can proceed in the absence of a catalyst, the present invention is based on the discovery of a class of catalysts that selectively promote the oxidation of these sulfur compounds to CO, so as to minimize the undesired formation of by-product $CO_2$. The partial oxidation reaction thus is conducted in the presence of a catalyst system comprising a metal oxide supported on a metal oxide support. In the broad practice of the present invention, the metal oxide support can be selected from the group consisting of titania, antimony oxides, tantala, tin oxide, lanthana, indium oxides, iron oxides, nickel oxide, cobalt oxide, gallium oxides, manganese oxides, chromia, tungsten oxide, hafnia, zirconia, ceria, niobia, silica and alumina. On the basis of cost and availability. the preferred metal oxide supports include those selected from the group consisting of zirconia ($ZrO_2$), ceria ($CeO_2$), niobia ($Nb_2O_5$), titania ($TiO_2$), silica ($SiO_2$) and alumina ($Al_2O_3$).

The supported metal oxide itself is made from a metal metal selected from the group consisting of vanadium (V), niobium (Nb), molybdenum (Mo), chromium (Cr), rhenium (Re), titanium (Ti), tungsten (W), manganese (Mn), tantalum (Ta) and mixtures thereof. The supported metal oxide is physically present as a surface layer on the metal oxide support. As a general rule, the metal oxide support and the supported metal oxide surface layer should not be the same. Vanadia is a preferred metal oxide surface layer. With reference to FIG. 1, this basic aspect of the present invention will be described.

A source of carbonyl sulfide (COS), and/or carbon disulfide ($CS_2$) is delivered through conduit 10 to a reactor 20. Separately, a stream of air, or more preferably oxygen, is fed into the reactor through conduit 30. Reactor 20 contains a supported metal oxide catalyst such as a supported vanadia catalyst with the vanadia supported on a metal oxide. Preferably, the metal oxide support for a vanadia surface coating is one selected from the group consisting of titania ($TiO_2$), zirconia ($ZrO_2$), ceria ($CeO_2$), niobia ($Nb_2O_5$), silica ($SiO_2$) and alumina ($Al_2O_3$). As will be explained in more detail hereinafter, the supported metal oxide catalysts, and specifically the vanadia supported catalyst, can take any convenient physical shape including tablets, spheres, pellets, extrusions, powder. The catalytic reactions of carbonyl sulfide and carbon disulfide with oxygen is a vapor-phase reaction and thus can be conducted in any vapor-phase reactor including the various known fixed- and fluid-bed configurations. In accordance with the present invention, the reactions are typically conducted at a temperature range of about 150° to 500° C., preferably at a temperature in the range of about 220° to 350° C., more preferably between 230° and 330° C. Normally the COS oxidation proceeds better, in terms of the conversion and selectivity to desired products, at the higher end of the noted temperature ranges, while the $CS_2$ oxidation favors the lower ends of these ranges. The oxidation reaction can conveniently be conducted at a pressure in the range of from about atmospheric pressure up to about 1,000 psig. Normally it will be carried out at a pressure in the range of from atmospheric pressure to 500 psig. Subatmospheric pressure conditions are not excluded, but normally do not provide a benefit commensurate with the expense and complexity. Generally, a large stoichiometric excess of oxygen relative to the carbonyl sulfide, or carbon disulfide is preferred. Contact time will vary with the process conditions, but typically in a fixed-bed reactor a contact time between about 1 and about 20, preferably between about 2 and about 10, seconds should be sufficient.

The reaction conditions are selected so as to maximize both the conversion of the feed COS and/or $CS_2$ and to maximize the selectivity of the oxidation to CO and $SO_2$. A stream containing CO and $SO_2$ flows out from reactor 20 through conduit 40. When $CS_2$ is oxidized, COS likely will also be an additional significant reaction product. The product stream will also contain excess oxygen, nitrogen (if air, or enriched air is used as the oxygen source) and unreacted feed materials. The reaction mixture then is processed in separation zone 50 to produce separate streams of CO and $SO_2$. Any of a wide variety of separation processes (and their combination) can be employed for separator zone 50, such as for example selective absorption, selective adsorption, rectification, molecular sieving and the like, to separate a stream of predominately CO, in conduit 60, from the $SO_2$ in conduit 70. For example, carbon monoxide may be selectively absorbed in an absorber using specific absorbents introduced into the separation zone 50 (by means not shown) and recovered therefrom. Other components (not shown) in the product stream from reactor 20, including COS, $N_2$, $O_2$ and the like, also are separated using known procedures. Any $CS_2$ and/or COS that is recovered from the reaction product in conduit 40 can be recycled (not shown) to reactor 20. Specific processing that can be used to produce the separate streams of CO and $SO_2$ are well-understood by those skilled in the art; the specific techniques and procedures form no part of the present invention and for that reason are not described in detail herein.

The separate streams of CO and $SO_2$ can then be used and/or further processed according to any of the wide variety techniques known in the art. For example, the $SO_2$ can be sent to a Claus plant for conversion to elemental sulfur, or further oxidized to sulfuric acid ($H_2SO_4$). The CO stream can be reacted with water in contact with an appropriate catalyst for carrying out the well known water gas shift reaction, leading to the production of hydrogen. Preferably, the CO stream is integrated into a process for converting $H_2S$ to hydrogen, avoiding, or at least minimizing the formation of $CO_2$, considered by many to be an environmental threat due to its alleged impact on global warming. If a separate COS stream is produced (not shown) as may occur when oxidizing $CS_2$ or if the conversion of COS is incomplete, it can be separated and returned to the reactor 30 for reaction with excess oxygen.

Figure 2:
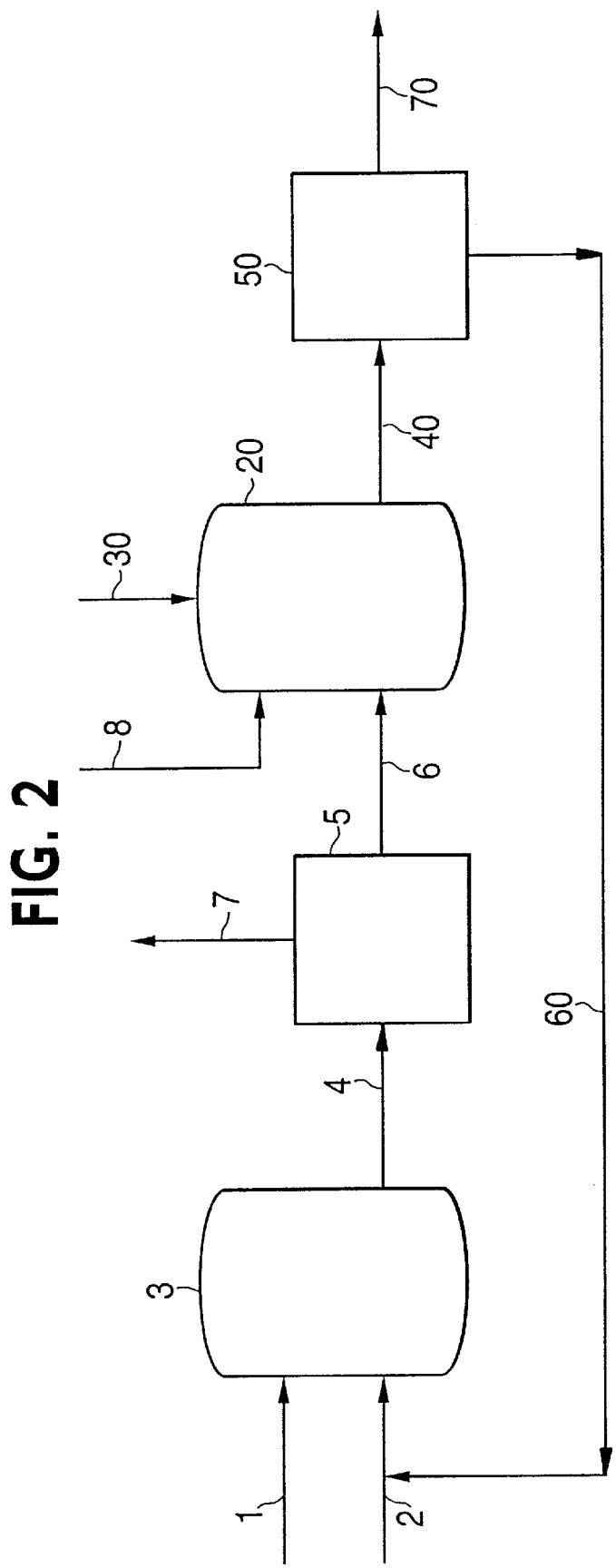
FIG. 2 is a simplified schematic flow diagram describing a preferred method of utilizing the present invention for producing hydrogen by reducing carbon monoxide with hydrogen sulfide.

With reference to FIG. 2, a preferred embodiment of the present invention now will be described. Separate streams of $H_2S$ and CO, in conduits 1 and 2, respectively, are fed into reactor 3 where the equilibrium reaction leading to the formation of hydrogen is conducted. The reaction of carbon monoxide with hydrogen sulfide to form carbonyl sulfide and hydrogen is a known vapor phase reaction and is described in such articles as *Journal of Catalysis*, 49, 3 79 (1977) and *Bulletin of Chemistry for Japan*, 51, 150 (1978), both by Fukuda et al. The reaction is typically conducted within a temperature range of 200° to 600° C., preferably in the range of from 250° to 400° C. Reaction pressures are generally within the range of from atmospheric pressure up to about 1,000 psig, and more usually are within the range of atmospheric pressure up to 500 psig. While a stoichiometric amount of each reactant is required, preferably a stoichiometric excess of one of the reactants, preferably hydrogen sulfide, is used as a means of shifting the equilibrium to the desired hydrogen product.

Preferably this reaction is conducted in the presence of a catalyst. Known catalysts include an oxide or sulfide of a Group 6b or 8 metal of the Periodic Table, which is optionally promoted with one or more metal compounds from Groups 4a, 1b and 2a. These catalysts can be supported or unsupported and if supported, the support can be selected from a wide range of materials including such compounds as alumina, silica, silica-alumina, zirconium oxide, thorium oxide, titanium oxide, etc. The catalyst can take any convenient physical shape including tablets, spheres, pellets, extrusions, powder. This reaction can be conducted in any vapor-phase reactor including the various fixed- and fluid-bed configurations and the contact time of the reactants over the catalyst bed will vary with the other process parameters. Typically, a contact time of 1–20, preferably 2–10, seconds is employed.

The reaction product containing a mixture of hydrogen and COS, along with unreacted $H_2S$ and CO, is delivered through conduit 4 into separator 5 where the $H_2$ is separated from the COS. Any of a wide variety of separation processes (and their combination) can be employed for separator 5, such as for example selective absorption, selective adsorption, rectification, molecular sieving and the like, to separate a stream of predominately COS, in conduit 6, from the $H_2$ in conduit 7. Hydrogen, for example, may be removed in separation zone 5 using a selective permeable membrane (not shown). Other components (not shown) in the product stream from reactor 3, including $H_2S$ and CO and the like, also are separated using known procedures. For example, an absorption step can be used in separation zone 5 to remove $H_2S$ by means of amine solutions, from which it can be recovered for recycle by a temperature controlled desorption (not shown). Specific processing that can be used to produce the separate streams of COS and $H_2$, separate from any unreacted feed material, are well-understood by those skilled in the art. The specific techniques and procedures form no part of the present invention and for that reason are not described in detail herein.

The hydrogen stream in conduit 7 can be used as a feedstock and/or further processed according to any of the wide variety processes known in the art. The COS stream in conduit 6 is delivered into reactor 20, joining a separate oxygen stream 30, for contacting with a supported metal oxide catalyst, generally a supported vanadia catalyst, in accordance with the present invention. Reactor 20 may also receive a separate (optional) feed of COS and/or $CS_2$ through conduit 8. In accordance with the present invention, the partial oxidation reaction of the COS (and optionally $CS_2$) is conducted at a temperature in the range of about 150° to 500° C., preferably at a temperature in the range of about 250° to 350° C., and at a pressure in the range of from about atmospheric pressure up to about 1,000 psig, normally at a pressure in the range of from atmospheric pressure to 500 psig. Other operating conditions are consistent with those described in connection with the embodiment of FIG. 1.

A stream containing CO and $SO_2$ (and other likely constituents as identified in connection with the embodiment of FIG. 1) flows out from reactor 20 through conduit 40. As described in connection with the embodiment of FIG. 1, the reaction mixture then is processed in separation zone 50 to produce, among others, separate streams of CO and $SO_2$. As before, any of a wide variety of separation processes can be employed for, or in combination as, separation zone 50, such as for example selective absorption, selective adsorption, rectification, molecular sieving and the like, to provide separate streams of predominately CO, in conduit 60, and $SO_2$ in conduit 70. The CO stream is recycled as at least part of the feed stream for reactor 3, while the $SO_2$ stream can be used and/or further processed according to any of the wide variety techniques known in the art. As noted above, the $SO_2$ can be sent to a Claus plant for conversion to elemental sulfur, or further oxidized to sulfuric acid ($H_2SO_4$).

As evident from information hereinbelow presented, the one-step process of the invention is operative to yield a high conversion and selectivity of the COS and $CS_2$ oxidation to CO.

The metal oxide supported catalyst, such as a vanadia supported catalyst, used in the process of this invention may be prepared by impregnation techniques well-known in the art, such as incipient wetness, grafting, equilibrium adsorption, vapor deposition, thermal spreading, etc. When using an incipient wetness impregnation technique, which is preferred, an aqueous or non-aqueous solution containing a metal oxide precursor, such as a vanadium oxide precursor compound(s) in the case of certain preferred supported metal oxide catalysts, is contacted with the metal oxide support or substrate material, preferably titania ($TiO_2$), zirconia ($ZrO_2$), ceria ($CeO_2$), niobia ($Nb_2O_5$), silica ($SiO_2$) and alumina ($Al_2O_3$), for a time sufficient to deposit a metal oxide precursor, such as a vanadia precursor material, onto the support such as by selective adsorption or alternatively, excess solvent may be evaporated leaving behind the metal oxide (vanadia) precursor compound or salt. If an incipient wetness impregnation technique is used to prepare the catalyst for use in this invention, the metal oxide precursor (e.g., salt) solution used may be aqueous or organic, the only requirement being that an adequate amount of the precursor compound be soluble in the solvent used in preparing this solution. Other impregnation techniques, such as vapor deposition and thermal spreading, do not require use of a solvent as does incipient wetness, and may be desirable in some circumstances to avoid the problem of volatile organic carbon (VOC) emissions.

For example, one way to disperse vanadium oxide on a zirconia (metal oxide) support or substrate is to impregnate spheres or powder (spheres or powder are used as representative examples of shapes of the zirconia support material) with a solution containing a vanadium compound. Generally, an aqueous solution is preferred. Criteria used to choose the vanadium compound for impregnation include whether the vanadium compound is soluble in the desired solvent and whether the vanadium compound decomposes at an acceptable rate at a high, calcination temperature to give the appropriate metal oxide (vanadia). Illustrative of suitable compounds of vanadium are the halides of vanadium, oxyacids, oxyacid salts and oxysalts of vanadium. Specific examples are vanadium tribromide, vanadium dichloride, vanadium trichloride, vanadium oxychloride, vanadium oxydichloride, vanadic acid, vanadyl sulfate, vanadium alkoxides (such as triisopropoxide), vanadium oxalate (which may be formed in situ by reaction of $V_2O_5$ and an aqueous solution of oxalic acid), and ammonium metavanadate. Compounds suitable for depositing other metal oxides such as a metal oxide of a metal selected from the group consisting of vanadium (V), niobium (Nb), molybdenum (Mo), chromium (Cr), rhenium (Re), titanium (Ti), tungsten (W), manganese (Mn), tantalum (Ta) and mixtures thereof on suitable metal oxide supports are well recognized by those skilled in the art, include for example halides, oxyacids and their salts, and alkoxides.

The impregnation of the metal oxide support or substrate, e.g., a zirconia ($ZrO_2$), ceria ($CeO_2$), niobia ($Nb_2O_5$), silica ($SiO_2$), titania ($TiO_2$), or/and alumina ($Al_2O_3$) support spheres or powder, with the metal oxide (vanadia) precursor compound solution may be carried out, as noted above, in ways well known in the art using either wet or dry impregnation techniques. One convenient method is to place the metal oxide support or substrate particles into a rotary evaporator which is equipped with a steam jacket. An impregnating solution of the precursor compound which contains an amount of metal, such as vanadium, for forming the metal oxide to be included in the finished catalyst (as the metal) is added to the support particles and the mixture is cold rolled (no steam) for a time from about 10 to 60 minutes sufficient to impregnate the support with the precursor compound solution. Next, steam is introduced and the solvent is evaporated from the impregnated solution. This usually takes from about 1 to about 4 hours. The impregnated support will normally be dried at temperatures ranging from about 50°–300° C. to remove excess solvent.

Water soluble metal oxide precursor compounds and especially water soluble vanadia precursor compounds are generally preferred for industrial applications because of the environmental concern about VOC emissions. Nonetheless, when using an organic solvent, initial heating may be done in a nitrogen atmosphere to remove any flammable solvent. Finally, the support particles are removed from the rotary evaporator and calcined in a suitable oxidizing atmosphere such as air, oxygen, etc. at a temperature of about 150° to 800° C., and more usually from 400°–600° C., preferably for about 1 to about 3 hours, sufficient to decompose the metal oxide precursor compound to the corresponding metal oxide. In some cases, as recognized by those skilled in the art, calcining conditions may need to be adjusted to avoid undesirably reducing catalyst surface area.

If any of the precursor compounds are air/moisture sensitive, they can conveniently be prepared under a nitrogen atmosphere as is recognized by those skilled in this art. The time required to calcine the composite will, of course, depend on the specific precursor compound(s) used and on the temperature and in general will range from about 0.5–7 hours. Calcination at 450° C. for about 2 hours has proven to be suitable for 1% vanadia on one of the noted preferred metal oxide supports. The precise time and temperature for calcination should be selected to avoid adversely affecting the metal oxide support and any degradation of extended surface areas. Selection of a suitable combination of time and temperature is a matter of routine testing to those skilled in the art.

The metal oxide precursors can be decomposed by using an inert atmosphere, such as nitrogen or helium, or by using a reducing atmosphere. To avoid potential safety concerns, the resulting composite should be calcined to convert the reduced metal component to the oxide form.

The metal oxide supported catalysts used in the process of this invention will generally have surface metal oxide loading of from about 0.5 to 35 wt. % metal oxide based on the total active catalyst composition, preferably from about 1 to 20 wt. %, more usually from about 1–15 wt. %, and most preferably 1–10 wt. % based on the total active catalyst composition. With the exception of a silica support, it is preferred that the vanadia be provided in an amount of up to a monolayer on the metal oxide support surface, and that generally no less than about 50% of the monolayer amount be used. As a rule of thumb, a monolayer coverage of vanadia is obtained at a vanadia loading of about 1% by weight vanadia per 10 $m^2$/g of metal oxide support surface area. The metal oxide used as the catalyst support component in accordance with the present invention generally should have a surface area in the range of about 1 to about 150 m²/g and higher, and preferably above about 5 m²/g. In the case of a silica support, on which a monolayer of vanadia cannot be formed, lower vanadia loadings are preferred. In particular, a vanadia loading between about 0.1 to 10%, and more preferably 1 to 5%, is preferred for a silica support.

These catalyst materials may be used in any configuration, shape or size which exposes their surface and the vanadia layer dispersed thereon to the gaseous stream passed in contact therewith. For example, these oxide supports, such as zirconia or titania can conveniently be employed in a particulate form or deposited (before or after impregnation with the metal oxide overlayer) on a monolithic carrier or onto ceramic rings or pellets. As particles, the support, such as zirconia, or titania can be formed in the shape of pills, pellets, granules, rings, spheres and the like. Use of free particulates might be desirable when large catalyst volumes are needed or if the catalyst bed is operated in a fluidized state. A monolithic form or deposition of the active catalyst on an inert ceramic support might be preferred in applications where catalyst movement is to be avoided because of concerns about catalyst attrition and dusting, and a possible increase in pressure drop across a particulate bed. In a preferred approach, a metal oxide supported catalyst such as a vanadia supported catalyst, such as a vanadia on titania or vanadia on zirconia catalyst, may be deposited on a ceramic carrier such as silicon carbide, silicon nitride, carborundum steatite, alumina and the like, provided in the shape of rings or pellets. Typically, the active catalyst will be applied to the inert ceramic support in an amount to provide 1 to 20% by weight of the supported metal oxide catalyst.

While the metal oxide, e.g., silica, zirconia, alumina, titania, niobia, ceria, and the like are conveniently referred to as supports or substrates in the description of the preferred embodiment of the present invention, based to a large degree on the way the catalysts are prepared, it should be noted that they may well provide important roles as active catalytic components in the supported metal oxide catalyst. Combination supports may also be advantageous for use in catalysts suitable for practicing the present invention.

Further details on the preparation and structure of metal oxide supported catalysts and especially vanadia supported catalysts useful in the practice of the present invention can be found in Jehng et al., *Applied Catalysis A*, 83, (1992) 179–200; Kim and Wachs, *Journal of Catalysis*, 142, (1993) 166–171; Jehng and Wachs, *Catalysis Today*, 16, (1993) 417–426; Kim and Wachs, *Journal of Catalysis*, 141, (1993) 419–429; Deo et al., *Applied Catalysis A*, 91, (1992) 27–42; Deo and Wachs, *Journal of Catalysis*, 146, (1994) 323–334; Deo and Wachs, *Journal of Catalysis*, 146, (1994) 335–345; Jehng et al., *J Chem. Soc. Faraday Trans.*, 91(5), (1995) 953–961; Kim et al., *Journal of Catalysis*, 146, (1994) 268–277; Banares et al., *Journal of Catalysis*, 150, (1994) 407–420 Jehng and Wachs, *Catalyst Letters*, 13, (1992) 9–20; Sun et al., *Methane and Alkane Conversion Chemistry*, pp. 219–226 (1995); Herman et al., *Catalysis Today*, 37: (1997) 1–14 and Sun et al., *J of Catalysis*, 165, (1997) 91–101, the disclosure of which are incorporated herein by reference.

Particularly preferred supported vanadia catalysts for the present invention include 5% $V_2O$ on $Nb_2O_5$ catalyst, which for COS oxidation at 290° C. provides a selectivity to CO of 98% and for $CS_2$ oxidation provides an 80% selectivity to CO, a 1% $V_2O_5$ on $SiO_2$ catalyst and a 4% $V_2O_5$ on titania catalyst.

EXAMPLES

To facilitate a more complete understanding of the invention, a number of Examples are provided below. The scope of the invention, however, is not limited to specific embodiments disclosed in these Examples, which are for purposes of illustration only.

Example 1

Catalyst Preparation and Characterization

Supported vanadia catalysts were prepared by the incipient wetness method. A vanadia on zirconia metal oxide supported catalyst was prepared in accordance with the following procedure. The vanadia-zirconia catalyst was prepared by using $ZrO_2$ (from Degussa—having a surface area of ~39 m²/g) as the support. The vanadia precursor (vanadium triisopropoxide ($VO(C_3H_7O)_3$ (available from Alfa at 95–99% purity) was supplied in isopropanol (Fisher certified ACS 99.9% pure). The $ZrO_2$ support was initially supplied as a fluffy powder. It was wet with isopropanol and dried at 120° C. for 16 hours to produce suitable particles for impregnation. The support particles then were calcined in air at 500° C. overnight. The vanadium oxide overlayer on the $ZrO_2$ support was prepared in a glove box under a nitrogen environment, since the alkoxide precursor is air and moisture sensitive. A solution of a known amount of vanadium triisopropoxide oxide and isopropanol, corresponding to the incipient wetness impregnation volume and the final amount of vanadium required, were prepared in a glove box filled with nitrogen. The solution of the vanadium precursor and isopropanol was then thoroughly mixed with the zirconia support and dried at room temperature in the glove box for 16 hr. The impregnated samples then were heated for one hour at 120° C. in flowing nitrogen and another hour at 300° C. The catalyst particles then were calcined in flowing air also at 300° C. for one hour and at 450° C. for two hours.

Other supported catalysts were made using substantially the same procedure, but substituting titania (from Degussa with a surface are of ~50 m²/g), ceria (from Engelhard with a surface area of ~36 m²/g), niobia (from Niobium Products Company with a surface area of ~55 m²/g), alumina (from Harshaw with a surface area of ~180 m²/g) and silica (from Cabot with a surface area of ~300 m²/g). To ready a silica powder for making a catalyst, it may be advantageous to mix the powdered silica with water until it becomes a gel. The gel is dried at 120° C. for 16 hours and then ground into particles. If necessary, the catalyst can then be pelletized, crushed and sieved to obtain catalyst particles sizes between 80 to 200 μm.

Example 2

The Catalytic Reactor

The oxidation reactions involving these catalysts were carried out in an isothermal fixed-bed integral mode reactor operating at atmospheric pressure. The quartz reactor (0.25 inch OD) was kept in a vertical position. Catalyst (25–50 mg for the COS oxidation and 25 mg for the $CS_2$ oxidation) was held at the middle of the reactor tube between glass wool plugs. Each catalyst sample was always pretreated by heating at 500° C. for 2 to 3 hours in flowing air, to remove adsorbed moisture on the catalyst surface prior to initiation of an experiment. The COS or $CS_2$ reactants were diluted in ultra high purity helium, as the carrier gas and excess oxygen was added. The reactor exit was directly connected to an on-line chromatograph (HP 5890A) equipped both with a Thermal Conductivity Detector (TCD) and a Sulfur Chemiluminiscence Detector (SCD, Sievers 355). The reactants and products were sampled using a 10-port valve (Valco), equipped with two identical 100 μl sampling loops. Two identical packed columns (2.0m×⅛ in. O.D. Silicosmooth™ tubing packed with Rt-Sulfur™ Polymer) operating in parallel were installed prior to the detectors. Data gathered by the detectors was processed with the aid of HP Chemstation V. 4.0 software.

The Catalytic Process

In a series of experiments, supported vanadia catalysts prepared in accordance with Example 1, comprising about 1% to 20% vanadia ($V_2O_5$) on the variety of supports, were contacted, in the presence of a large stoichiometric excess of oxygen, with a helium stream containing either COS or $CS_2$ at a total pressure of one atmosphere absolute and over a wide temperature range in order to explore the nature of the catalyzed oxidation reactions. The total gas flow was maintained at 130 sccm and 100 sccm for COS and $CS_2$ oxidation, respectively. COS oxidation was conducted over the temperature range of 290° to 330° C. at a COS partial pressure of 400 ppm, while the $CS_2$ oxidation was conducted over the temperature range of 230° to 270° C. at a $CS_2$ partial pressure of 700 ppm. The oxygen partial pressure was 5 and 10% respectively for the COS and $CS_2$ oxidation. Under these conditions, COS conversions varied between 1.7 and 51.7%, while $CS_2$ conversion varied between 0.1 and 98%.

The catalytic process of this invention provided a selectivity to CO in the oxidation of COS over the entire temperature range tested of greater than about 80% using the following catalysts: 20% vanadia on alumina, 7% vanadia on niobia catalyst, 1–5% vanadia on silica, 4% vanadia on zirconia and 3% vanadia on ceria. Using the same supported catalysts, the catalytic process of this invention provided a selectivity to CO in the oxidation of $CS_2$ over the entire temperature range tested of over about 50% using the following catalysts: 20% vanadia on alumina, 5% vanadia on titania, 7% vanadia on niobia catalyst, 1% vanadia on silica and 4% vanadia on zirconia.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims. Reasonable variation and modification are possible within the scope of the foregoing description and the appended claims to the invention the essence of which is that there has been set forth a process for the conversion of a COS and/or $CS_2$ in high yield and high selectivity to CO and $SO_2$.

I claim:

1. A process of reducing carbon monoxide with hydrogen sulfide to produce hydrogen, the method comprising:
   (a) contacting carbon monoxide with hydrogen sulfide to form hydrogen and carbonyl sulfide,
   (b) contacting the carbonyl sulfide produced in (a) with oxygen in the presence of a supported metal oxide catalyst having a support selected from the group consisting of titania, antimony oxides, tantala, tin oxide, lanthana, indium oxides, iron oxides, nickel oxide, cobalt oxide, gallium oxides, manganese oxides, chromia, tungsten oxide, hafnia, zirconia, ceria, niobia, silica and alumina, to form carbon monoxide and sulfur dioxide.

2. A process according to claim 1 wherein said metal oxide is an oxide of a metal selected from the group consisting of vanadium (V), niobium (Nb), molybdenum (Mo), chromium (Cr), rhenium (Re), titanium (Ti), tungsten (W), manganese (Mn), tantalum (Ta) and mixtures thereof.

3. A process according to claim 2 wherein said support is selected from the group consisting of titania ($TiO_2$), zirconia ($ZrO_2$), ceria ($CeO_2$), niobia ($Nb_2O_5$), and alumina ($Al_2O_3$).

4. A process according to claim 2 wherein said metal oxide is vanadia.

5. A process according to claim 4 wherein said support is silica ($SiO_2$).

6. A process according to claim 4 wherein said supported metal oxide catalyst has a surface vanadia loading of 0.5 to 35 wt. % sufficient to provide from no less than about 50% of a monolayer amount up to a monolayer on the metal oxide support surface.

7. A process according to claim 6 wherein said supported vanadia catalyst has a surface vanadia loading of 0.1 to 20 wt. %.

8. A process according to claim 4 wherein said support is niobia ($Nb_2O_5$).

9. A process according to claim 4 wherein the support is alumina ($Al_2O3$).

10. A process according to claim 4 wherein the support is zirconia ($ZrO_2$).

11. A process according to claim 4 wherein the support is titania ($TiO_2$).

12. A process of reducing carbon monoxide with hydrogen sulfide to produce hydrogen, the method comprising:
    (a) contacting carbon monoxide with hydrogen sulfide to form hydrogen and carbonyl sulfide, and
    (b) contacting the carbonyl sulfide produced in (a) with oxygen in the presence of a supported vanadium (v) oxide catalyst having a support selected from the group consisting of titania, antimony oxides, tantala, tin oxide, lanthana, indium oxides, iron oxides, nickel oxide, cobalt oxide, gallium oxides, manganese oxides, chromia, tungsten oxide, hafnia, zirconia, ceria, niobia and alumina, to form carbon monoxide and sulfur dioxide, wherein said vanadium oxide is provided from no less than about 50% of a monolayer amount up to a monolayer on the support.

13. A process according to claim 12 wherein said supported vanadia catalyst has a surface vanadia loading of 0.1 to 20 wt. %.

14. A process according to claim 13 wherein said support is niobia ($Nb_2O_5$).

15. A process according to claim 13 wherein the support is alumina ($Al_2O_3$).

16. A process according to claim 13 wherein the support is zirconia ($ZrO_2$).

17. A process according to claim 13 wherein the support is titania ($TiO_2$).

18. A process of reducing carbon monoxide with hydrogen sulfide to produce hydrogen, the method comprising:
    (a) contacting carbon monoxide with hydrogen sulfide to form hydrogen and carbonyl sulfide,
    (b) contacting the carbonyl sulfide produced in (a) with oxygen in the presence of a supported metal oxide catalyst having a support selected from the group consisting of titania, antimony oxides, tantala, tin oxide, lanthana, indium oxides, iron oxides, nickel oxide, cobalt oxide, gallium oxides, manganese oxides, chromia, tungsten oxide, hafnia, zirconia, ceria, niobia and alumina, to form carbon monoxide and sulfur dioxide, wherein said metal oxide is an oxide of a metal selected from the group consisting of vanadium (V), niobium (Nb), molybdenum (Mo), chromium (Cr), rhenium (Re), titanium (Ti), tungsten (W), manganese (Mn), tantalum (Ta) and mixtures thereof and said metal oxide is provided as a monolayer on the support and
    (c) providing at least some of the carbon monoxide of step (b) as the carbon monoxide for step (a).

19. The process according to claim 18 wherein the metal oxide is vanadia.

20. The process according to claim 19 wherein said support is selected from the group consisting of titania ($TiO_2$), zirconia ($ZrO_2$), ceria ($CeO_2$), niobia ($Nb_2O_5$), and alumina ($Al_2O_3$).

* * * * *